(12) United States Patent
Nair (10) Patent No.: US 10,832,320 B2
(45) Date of Patent: *Nov. 10, 2020

(54) DYNAMIC HANDLING FOR RESOURCE SHARING REQUESTS

(71) Applicant: PAYPAL, INC., San Jose, CA (US)

(72) Inventor: Rahul Nair, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 342 days.

This patent is subject to a terminal disclaimer.

(21) Appl. No.: 15/682,488

(22) Filed: Aug. 21, 2017

(65) Prior Publication Data

US 2018/0040065 A1 Feb. 8, 2018

Related U.S. Application Data

(63) Continuation of application No. 14/642,629, filed on Mar. 9, 2015, now Pat. No. 9,741,074.

(51) Int. Cl.
*G06Q 40/02* (2012.01)

(52) U.S. Cl.
CPC ................. *G06Q 40/025* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| | | | | |
|---|---|---|---|---|
| 7,890,421 B2* | 2/2011 | Dumas-Brown | ...... | G06Q 20/10 705/39 |
| 7,937,291 B2* | 5/2011 | Carlson | ................. | G06Q 20/10 705/14.64 |
| 8,160,934 B2* | 4/2012 | Carlson | .............. | G06Q 10/0637 705/26.4 |
| 8,676,674 B2* | 3/2014 | Perlman | ................. | G06Q 20/02 705/30 |
| 9,172,468 B2* | 10/2015 | Kurashima | ............ | H04B 10/40 |
| 9,712,468 B2* | 7/2017 | Patel | ....................... | H04W 4/90 |
| 2002/0133455 A1 | 9/2002 | Howorka et al. | | |
| 2002/0198806 A1 | 12/2002 | Blagg et al. | | |
| 2007/0250442 A1 | 10/2007 | Hogan et al. | | |

(Continued)

OTHER PUBLICATIONS

Hattel et al., "Promoting Credit Bureaus: The Role of Microfinance Associations", CITI Network Strengthening Program, The Seep Network (Year: 2010).*

*Primary Examiner* — Frantzy Poinvil
(74) *Attorney, Agent, or Firm* — Haynes and Boone, LLP (57) ABSTRACT

A system or method is provided to allow users to share or donate a portion of their credit line to others. In particular, the system may provide an interface between credit line donors and recipients and allow a user's friends or family to donate portions of their credit lines to the user. With the system serving as an intermediary between the borrowers and the lenders, the credit line donation arrangement may be hidden from the lenders. The system may manage the distribution of the credit line from the five donor friends to the beneficiary friend. Further, the system may manage the payoff or pay back of the credit lines from the beneficiary friend back to the lenders. In particular, based on the donation arrangement, the system may receive the payoff amount from the beneficiary user and distribute the payoff back to the lenders.

20 Claims, 5 Drawing Sheets

(56) References Cited

U.S. PATENT DOCUMENTS

| | | | |
|---|---|---|---|
| 2009/0119202 A1* | 5/2009 | Dumas-Brown | G06Q 40/02 705/38 |
| 2010/0121745 A1* | 5/2010 | Teckchandani | G06Q 20/10 705/30 |
| 2012/0197793 A1 | 8/2012 | Grigg et al. | |
| 2013/0204780 A1* | 8/2013 | Karri | G06Q 20/29 705/40 |
| 2013/0332348 A1* | 12/2013 | Lee | G06Q 30/06 705/39 |
| 2014/0032376 A1* | 1/2014 | Tyagi | G06O 30/0601 705/27.1 |
| 2014/0310152 A1 | 10/2014 | Lilly et al. | |
| 2015/0348185 A1* | 12/2015 | Frost | G06Q 40/02 705/35 |
| 2016/0042328 A1* | 2/2016 | Teckchandani | G06Q 10/00 705/44 |
| 2016/0140641 A1* | 5/2016 | Baca | G06O 30/0627 705/26.63 |
| 2016/0189156 A1* | 6/2016 | Kim | G06O 20/4012 705/72 |
| 2017/0169408 A1* | 6/2017 | Vaananen | G06Q 20/102 |

* cited by examiner

DYNAMIC HANDLING FOR RESOURCE SHARING REQUESTS

CROSS-REFERENCE TO RELATED APPLICATIONS

This application is a continuation of and claims priority to U.S. patent application Ser. No. 14/642,629, filed Mar. 9, 2015, now U.S. Pat. No. 9,741,074, which is incorporated herein by reference in its entirety.

BACKGROUND

Field of the Invention

The present invention generally relates to user interfaces and processing for facilitating credit line sharing.

Related Art

Consumers use credit lines or lines of credit for various purchases or transactions. For example, consumers may use credit lines to apply for credit cards, make small purchases, rent cars, borrow money, and the like. A consumer's credit line typically is determined based on the consumer's credit history or income. However, certain consumers, such as students, new immigrants, or the like, may have limited credit history or income. These consumers may have difficulty obtaining a credit line and may be excluded from making certain purchases or conducting certain transactions, such as renting a car or reserving a hotel. Therefore, there is a need for a system or method that allows a consumer who has limited credit history to obtain an adequate credit line.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method is provided to allow users to share or donate a portion of their credit line to others. The shared or donated credit lines may be designated for a beneficiary's use for a specific period of time or for a specific number of transactions. In particular, the system may provide an interface between credit line donors and recipients and allows a user's friends or family to donate portions of their credit lines to the user. For example, five friends may set up a $1,000 credit line for a friend by each donating $200 of their credit line to their friend. The system may mark off or designate $200 from each of the five friend's credit line for their friend. As such, the $200 of each of their credit line would not be available for their use.

In an embodiment, the system may obtain the $200 credit line from one or more lenders, such as banks or merchants, on behalf of each of the five friends. The lenders may set up credit lines for the five friends. With the system serving as an intermediary between the borrowers and the lenders, the credit line donation arrangement may be hidden from the lenders. The system may manage the distribution of the credit line from the five donor friends to the beneficiary friend.

In an embodiment, the system may manage the payoff or pay back of the credit lines from the beneficiary friend back to the lenders. In particular, based on the donation arrangement, the system may receive the payoff amount from the beneficiary user and distribute the payoff back to the lenders or to credit the respective credit accounts of the donors. The credit lines of the donors may then be raised based on the amount paid back by the beneficiary friend. In some embodiments, the system may allow the beneficiary and/or the donor to designate or negotiate the payoff terms and conditions.

In an embodiment, the system may allow a credit line donor to designate conditions and/or restrictions on the user of credit line. For example, a credit line donor may set up restrictions to prevent the donated credit line to be used for certain types of transactions or purchases. The credit line donor also may designate other terms and conditions, such as expiration date, a limited number of times of use, limit on location, limit on merchants, and the like.

In an embodiment, the system may provide reports or credit summaries to the donors, the recipients, and/or lenders. The system may provide appropriate information to different entities. In particular, the donation arrangement between the donors and the recipients may be hidden from the lenders.

In an embodiment, the system may allow users to communicate their request for a credit line to other users. For example, a user may post his/her request for credit line donation on his/her social network or may email his/her request to friends and/or family members. The system may allow friends and/or family member to initiate a credit line donation process by responding to the request, such as selecting a link included with the request. The system may provide an interface for credit line donors to access their credit lines, select and/or designate all or a portion of their credit line, designate other terms and conditions for the donation, and send the credit line donation to the recipient.

In embodiment, the system may provide an interface for the recipients to manage and pay off any transactions or purchases made using a credit line. The interface may present outstanding amount, payment progress, interest rate, fees, terms, and conditions of various credit lines borrowed from others. The system also may send reminders and/or alerts to the credit line recipients to notify them of any deadlines or events.

Figure 1:
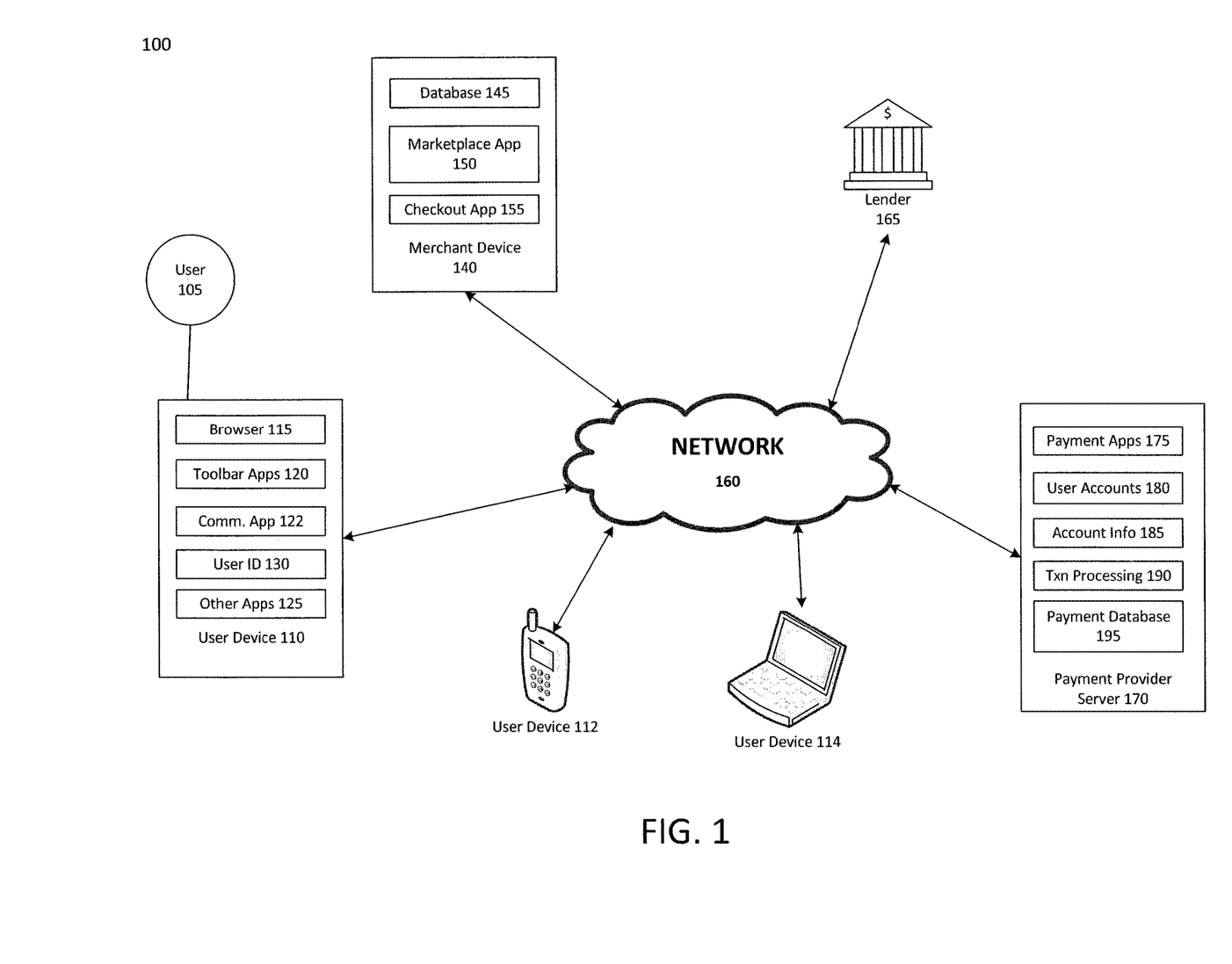
FIG. 1 is a block diagram of a networked system suitable for facilitating credit line sharing according to an embodiment.

FIG. 1 is a block diagram of a networked system 100 suitable for implementing a process for credit line sharing according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include user devices 110, 112, and 114, a lender 165, a merchant server 140, and a payment provider server 170 in communication over a network 160. A payment service provider, such as PayPal, Inc. of San Jose, Calif., may maintain the payment provider server 170. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including credit line request/donation, payments, transfer of information, display of information, etc. For example, user 105 may utilize user device 110 to request for a credit line donation from other users. Although only one merchant server is shown, a plurality of merchant servers may be utilized if the user is purchasing products or services from multiple merchants.

User devices 110, 112, and 114, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable computing device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise request and/or donate credit line as discussed herein. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User devices 112 and 114 may include one or more similar components as those of user device 110. User devices 112 and 114 may be owned and/or operated by other users.

Lender 165 may be a financial institution, such as a bank, a credit union, or the like, that offers credit lines or loans to consumers. In some embodiments, the merchant or the payment service provider is the lender 165. The lender 165 may receive requests for credit line or loans from consumers, analyze the consumers' credit history, income, current liability, and other credit related factors and may determine an amount of credit line or loan to offer the consumers.

Merchant server 140 may be maintained, for example, by a merchant or seller offering various products and/or services. The merchant may have a physical point-of-sale (POS) storefront. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers. For example, a payment may be a donation to a charity or a deposit to a saving account. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, credit obtained from other users, and the like.

Payment provider server 170 may be maintained, for example, by an online payment service provider, which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including credit from other users as described herein. As such, transaction processing application 190 may store details of an order from individual users, including funding source used, credit options available, etc. Payment application 175 may be further configured to determine the existence of and to manage accounts for user 105, as well as create new accounts if necessary.

The payment provider server 170 also may serve as an intermediary between lenders, merchants, and users for facilitating credit line sharing among users. The payment provider server 170 may provide an interface for users to donate/offer and/or receive credit lines to and/or from others. The payment provider server 170 may provide a platform for users to designate and negotiate different terms and conditions of a credit line donation. The payment provider server 170 may manage the distribution of credit lines and the payoff process of different credit lines.

Figure 2:
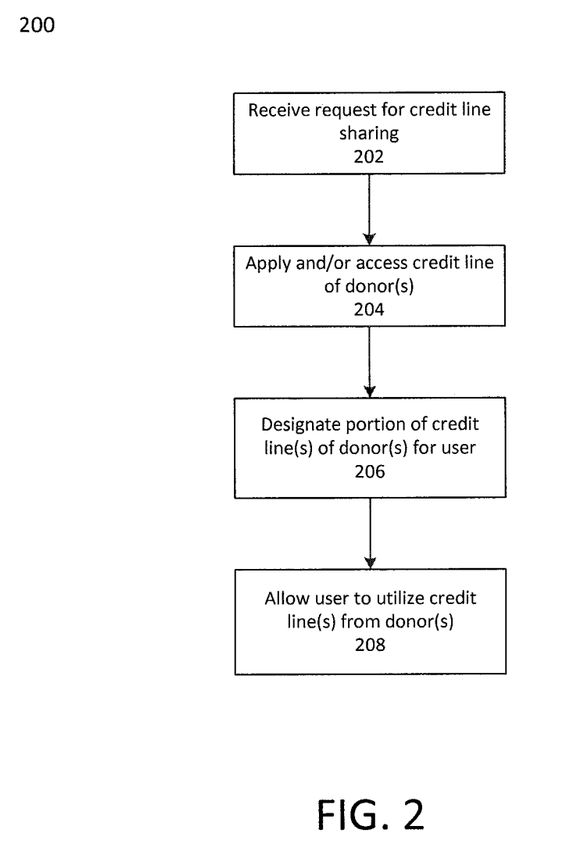
FIG. 2 is a flowchart showing a process for facilitating credit line sharing according to one embodiment.

FIG. 2 is a flowchart showing a process 200 for credit line sharing according to one embodiment. At step 202, the system, such as the user device 110, the merchant device 140, or the payment provider server 170, may receive a request from the user 105 for credit line sharing. For example, the user 110 may have limited credit history or limited income and may need additional help for getting a credit line or an increased credit line. The system may provide an interface for the user 110 to enter personal and financial information of the user 110. For example, the user 110 may enter name, address, social security number, contact information including phone number, email address, and the like. The user 110 also may provide financial information, such as income, employer information, bank accounts, loans or other liabilities, and the like. In some embodiments, the user 110 may have a payment account at payment provider server 170, as such the user 110's personal and financial information may be provided from the user 110's payment account.

The user 110 also may provide information regarding a reason or purpose for the request for a credit line or credit line increase. For example, the user 110 may need a revolving credit line for renting a car, booking a hotel, purchasing a computer, school tuition or supplies, small business expenses, or various other reasons. The user 110 may also designate an amount of credit line requested or an amount of increase, such as $1,000 or $20,000.

In some embodiments, the system may provide an estimate of the user 110's own credit line (before adding credit line donated from other users). For example, the system may perform the estimation based on the user 110's credit history, income, and other financial information and according to common lending rules used by lenders. This estimated credit line or increase may be presented to the user 110, such that the user 110 may determine how much credit line to request from other users. For example, the user 110 may wish to purchase a television priced at $1,000. The system may estimate that the user 110 has a $500 of credit line. Thus, the user 110 may determine that the user 110 needs to request $500 of credit line from other users. In some embodiments, the system may automatically estimate the user 110's credit line and may determine the amount the user 110 would need to request from other users based on the total amount of credit line the user 110 needs.

The user 110 also may enter a preferred lender, if any. In some embodiments, the lender may be the merchant from whom the user 110 wishes to purchase products or services. For example, the user 110 may obtain a line of credit from a home improvement store for the user 110's home improvement projects. In some embodiments, the system may recommend one or more lenders for the user 110 based on the user 110's credit history, financial information, purpose of credit line, location, and the like. In some embodiments, the system may recommend one or more lenders for the user 110 based on other users related to the user 110. For example, the system may select and recommend lenders that offer better interest rates or greater credit lines, good customer ratings based on the credit history, financial information, location, income, or other financial information of other users who are related to the user. The other users related to the user 110 may be determined based on the user 110's social media network, contact list, and the like. Other related users may also have accounts with the payment service provider who may already have personal and financial information of the other related users. In one embodiment, the lender may be a payment service provider that other users who may be donating part/all of their credit lines are currently using or have accounts with. As such, the system may select suitable lenders that are suitable for the user 110, and in addition, for the other users who are related to the user 110 and who likely are willing to donate their credit lines to the user 110.

The user 110 also may provide terms and conditions for the credit line sharing arrangement. In particular, the user 110 may designate whether the credit line will have certain user restrictions. For example, the user 110 may request a credit line to pay for school. To strengthen the legitimacy of the credit line request, the user 110 may set up use restrictions for the credit line to be used only for education related expenses. The system may restrict the use of the credit line to certain categories of merchants, by using Merchant Category Codes (MCC), as commonly used in the card transaction industry.

The user 110 also may set an expiration date or a duration limit for the credit line. For example, the user 110 may request a credit line to last for one school semester for a credit line used for an educational purpose. In some embodiments, the user 110 may provide or estimate a payoff schedule for the credit line. For example, the user 110 may plan to pay off the donated credit line within one year.

The system may collect the personal and financial information from the user 110 along with the user 110's credit line request and may generate a credit line request for the user 110. The credit line request may include the user 110's request amount, purpose for the credit line, preferred lender (if any), recommended lenders, payoff schedule, and/or other terms, limitations, and conditions for the credit line. The system may allow the user 110 (or the system itself) to send the credit line request to other users, such as friends and/or family members. For example, the user 110 may enter the contact information, such as email address, user name, phone number, address, and the like of the other users who are likely to help the user 110. The system may communicate the user 110's request to the other users. In an embodiment, the system may generate an URL link for the user 110's credit line request. The URL link may direct other users to a web page of the user 110's credit line request. Thus, the user 110 may copy and paste the URL link to emails, text messages, blogs, and/or social networking pages.

The other users who receive the user 110's credit line request may respond to the request. In an embodiment, the credit line request may include an URL link that directs the other users to the system's API for credit line donation. For example, other users may operate user devices 112 and/or 115 to activate, press, or click on a button or a link included in the user 110's credit line request. The other users may then be redirected to the system's credit line donation page generated by the system's API.

The system may then provide additional information regarding the credit line sharing arrangement to potential donors. In particular, the system may present the total amount of credit line requested, the amount already donated from other users, amount still needed to reach the total requested amount, number other donors, identity of other donors (based on privacy settings), preferred lender(s), use purpose of the requested credit line, use restrictions on the credit line (if any), expiration, the user 110's payoff schedule, and the like. In some embodiments, the user 110 may provide a personal message to potential donors to request or encourage their donation. For example, the user 110 may include a personal message: "Dear friends, I am enrolled at XXX university this semester and am in need of a credit line to pay for a laptop computer to be used for my classes. I need $1,000 of credit line to purchase the laptop computer. I will be working this semester to pay off the laptop computer. Any donation from you is greatly appreciated! Thanks."

If a potential donor wishes to make a credit line donation to the user 110, the potential donor may provide his/her personal and/or financial information to begin the donation process. In some embodiments, the potential donor already has an account in the system. In such a case, the potential donor may log in and the system may authenticate the potential donor for the account. The system may then retrieve the potential donor's personal and financial information from the account.

The system may use the donor's personal and financial information to apply for a credit line for the donor with the lender. The lender may be a preferred lender designated in the credit line request. In other embodiments, the system may select and recommend one or more lenders for the donor to use. In particular, the recommended lenders may be selected based on the donor's personal and financial information. For example, based on the donor's personal and financial information, the system may recommend one or more lenders that offer better interest rates or teams for the donor.

At step 204, after the donor selects and confirms a lender, the system may then begin the process of applying for a credit line at the lender on the donor's behalf. In particular, the system may send the donor's personal and financial information to the selected lender to apply for a credit line. The lender 165 may be a merchant, a bank, the payment service provider, or any financial institution that offers credit lines or loans to consumers. The lender 165 may analyze the personal and financial information of the donor and may determine an amount of a credit line based on certain lending rules. For example, the lender 165 may consider the donor's credit score, income, location, debt amount, and the like to determine an amount of credit line to offer to the donor. The lender 165 also may determine offers and/or terms for the credit line, such as the type of credit, use restrictions, payoff terms, and other terms and conditions for the credit line. The lender 165 may communicate the credit line offer back to the system, such as the payment provider server 170. The system may then present the credit line offer from the lender 165 to the donor. The credit line offer may include the amount of credit line, terms, conditions, other restrictions of the credit line. For example, some credit lines are used only for certain purchases at certain merchants. If the donor already has an existing credit line with the lender, the donor may simply be notified of the current credit line and how much of that credit line can be donated.

Figure 5:
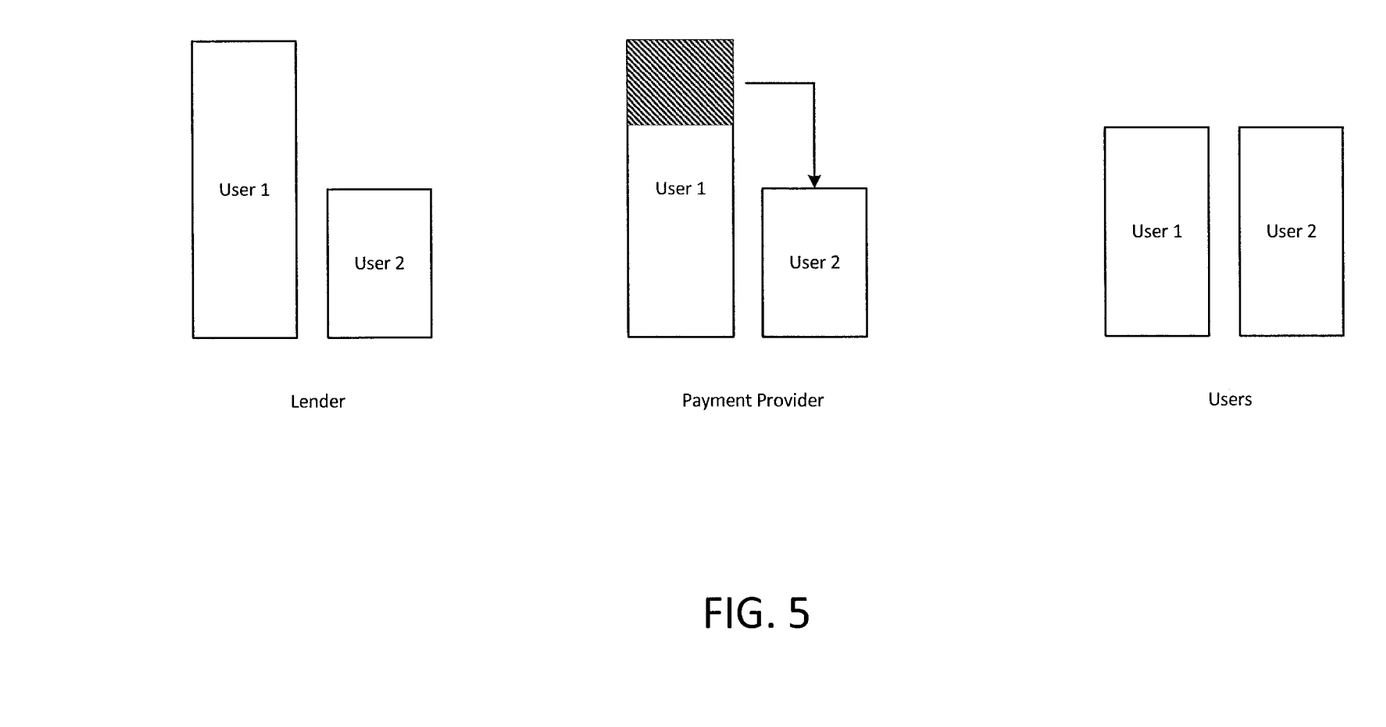
FIG. 5 illustrate diagrams of users' credit lines as viewed by different entities according to one embodiment.

At step 206, the system may provide an interface for the donor to designate all or a portion of the donor's credit line for the user 110. The designation may be by percentage or by dollar amount. For example, the lender 165 may offer the donor a credit line of $10,000. The donor may designate 10% or $1,000 of the credit line for the user 110. As shown in FIG. 5, from a lender 165's point of view, user 1 has a higher amount of credit line than user 2. User 1 may be a donor who donates a portion of user 1's credit line to user 2. From the payment provider's point of view, the payment service provider may designate a portion of user 1's credit line to user 2 to be used by user 2. From the user's point of view, user 1's credit line is reduced by the donation and user 2's credit line is increased by the donation. As such, user 1 is restricted to use the reduced credit line and user 2 may enjoy the increased credit line. The system may serve as an intermediary between the lenders and the users. For example, the system may manage the use of the credit lines and the payoff of the credit lines. Thus, the system may keep the credit line sharing arrangement hidden from the lender's view. For example, from the lender's point of view, when user 2 utilizes the donated portion of user 1's credit line, it is user 1 who uses up the donated portion of the credit line. Further, when user 2 pays off the donated portion of user 1's credit line, the payoff proceeds are received from user 1. The systems may take care of the distribution and pay off of credit lines among the users.

The terms and conditions set by the lender 165 may apply both to the donor and the user 110. In some embodiments, the system may allow the donor to designate additional terms and conditions for the credit line sharing arrangement. In an example, the donor may set a use restriction on the type of merchants or the type of purchases or transactions the donated credit line can be used for. The donor also may set restriction on location of use, limit on the number of times of use, and the like. In another example, the donor may set an expiration time or date for the donated credit line, such that after a period of time, the donated credit line may expire. In still another example, the donor may designate payoff terms and schedule to require that the user 110 or the recipient pay off the donated credit line within certain time or with a payoff schedule. The donor also may restrict the use of the donated credit line to one time use. As such, the donated credit line may only be used once. In contrast, multiple time use of the credit line may allow the user 110 to use the credit line, pay off the credit line, and repeat the use for multiple times, similar to a revolving credit line.

The system may allow the donor to set privacy settings. The donor may adjust privacy settings to allow/restrict the user 110 or the recipient to view the identity of the donor. As such, the donor has the option of remaining an anonymous donor. The donor also may adjust the privacy settings to allow/restrict other donors from seeing the identity and/or amount of donation of the donor. Thus, the donor has the option of remaining anonymous with regard to other donors. In some embodiments, the system may allow the donor to send the donation to the user 110 or the recipient with a personal message. For example, the donor may send a message: "Hey XXX, I just supported your goal. Best of luck and let me know how it goes."

In an embodiment, the system may generate a summary report of the progress of credit line donation. In particular, the summary report may indicate how many percent or amount needed until the donation goal is reached. For example, the user 110 may have a goal of getting a $1,000 credit line. Currently, the user 110 has received $600 from donors, which is 60% of the user 110's goal. The summary report also may indicate the number, dollar amount, and/or the identity of donors who donated. This may incentivize more people to participate. The system may continuously update the summary report to track the donation progress. The summary report may be presented with the user 110's request for credit line, so potential donors may see the progress.

At step 208, the system may allow the user 110 or the recipient to utilize the donated credit line(s). The donated credit line(s) may be used for various purposes such as obtaining a credit card with a revolving credit line, obtaining a loan, purchasing a product or service, signing up for a service or membership, renting a car, reserving a hotel, and the like. When the user 110 is attempting to use a credit line for a purchase or transaction, the system may first check for the user 110's own credit line. If the user 110's own credit is not adequate to cover the purchase or transaction, the system may select from one or more donated credit lines to cover the deficiency.

The system may select from multiple credit lines donated from multiple donors. Different donated credit lines may have different credit amounts, expirations, conditions, terms, and restrictions. The system may select donated credit lines that have not expired. The system also may select donated credit lines that are applicable for the transaction or purchase currently being processed. In particular, the system may select donated credit lines that do not have restrictions for the type of purchase or transaction being processed. For example, if the user wishes to use a credit line to purchase a computer, the system may select credit lines that do not have restrictions on making purchases of electronics or computers. In another embodiment, credit lines may be selected to minimize the total number of donated credit lines used. For example, if one credit line is sufficient to meet the user's needs, that one may be selected, as opposed to selecting two or more different credit lines with lower credit lines.

The system may filter and select donated credit lines that are applicable to the current transaction or purchase and may list the available and applicable donated credit lines to the user 110. The list of donated credit lines may be presented as a table listing each donated credit line's donor information, amount, expiration, interest rate, payoff requirement, conditions, terms, and other restrictions or limitations. For example, certain credit lines may only be used once. In another example, certain credit lines may have location restrictions. In some embodiments, the system may list the donated credit lines in a particular order based on one or more of interest rate, expiration date, amount, and the like. In an embodiment, the system may list the donated credit lines based on the relationship between the user 110 and the donors. For example, donors who are related closer to the user 110 may be listed first. This may allow the user 110 to prioritize and select donors who are closer to the user 110, have lower interest rates, have longer payoff periods, etc.

The user 110 may sort or rearrange the list of donated credit lines based on different parameters, such as by amount, by expiration, by relationship, by payoff terms, by interest rate, by minimum monthly payment amount, and the like. Thus, the list of donated credit lines may be sorted based on the user 110's preference. The user 110 may select one or more donated credit lines to be used for the purchase or transaction. As the user 110 selects the donated credit line(s), the system may display and update the amount of credit lines still needed for the purchase or transaction. For example, the purchase or transaction may require $1,000. The user 110 may select a $300 donated credit line, a $600 donated credit line and then a $100 donated credit line. The system may display how much more money is needed after each selection in a pie or bar graph to help user 110 visualize how much credit line is still needed to make the purchase or transaction.

After the user 110 selects the donated credit line(s) to be used for the transaction or purchase, the system may display a summary of the donated credit line(s) to be used and their terms and conditions. For example, different donated credit lines may have different interest rates, different payoff schedules, and the like. In some embodiments, the system may automatically determine or calculate a payoff schedule in view of the selected credit lines. In particular, based on the expirations, payoff requirements, and other terms and conditions of different donated credit lines, the system may estimate or calculate one or more payoff schedule for the user 110. For example, a first donated credit line may expire in five months and a second donated credit line may require monthly minimum payments. The system may plan a payoff schedule that pays off the first donated credit line in five months and including a recurring minimum monthly payment for the second donated credit line. As such, the user 110 may be properly informed of the payoff requirements for the combination of donated credit lines selected. If the user 110 is not able to or is not willing to fulfill the required payoff schedule based on the selected combination of donated credit lines, the user 110 may select a different combination of credit lines that may resulted in a more desirable payoff schedule for the user 110.

The system may allow the user 110 to try different combinations of donated credit lines to find a suitable combination. In some embodiments, the system may allow the user 110 to select a preference and the system may select a combination of donated credit lines based on the user 110's preference. For example, the user 110 may have a preference for longer pay off schedules or smaller monthly payments. The system may select a combination of donated credit lines with longer expiration dates or with lower monthly minimum payments. In another example, the user 110 may have a preference to pay off the credit lines quickly. The system may select a combination of donated credit lines that have shorter payoff periods or that have no early payoff penalty.

After the user 110 finalizes the selection of donated credit lines, the system may request the funds from lenders who offer the donated credit lines. In particular, the system may request the funds from the lenders under the respective donors' name and their behalf. As such, from the lenders' point of view, the funds are utilized by the donors themselves, but not by the user 110 or the recipient of the donated credit line. The lenders may reduce the donor's credit account by the donated amount. The system then may aggregate the funds obtained from the lenders and may apply the funds to the user 110's transaction or purchase along with funds from the user 110's credit line (if any). Thus, for the merchant point of view, the funds are entirely from the user 110's credit line. The merchants may be hidden from the credit line sharing arrangement.

Accordingly, the system may allow the user 110 to request other users to share and donate all or part of their credit line to the user 110. The system may facilitate the credit line donation process of the donors. Further, the system may manage one or more credit lines donated from donors. When the user 110 is ready to utilize the donated credit lines, the system may facilitate the transfer of donated credit lines to the user 110 and may apply the donated credit lines to the user 110's purchases or transactions. In particular, the system may manage and keep track of the various terms and limitations of different donated credit lines to ensure proper adherence to each of the different terms and limitations. The system may serve as an intermediary among the lenders, the credit line donors, the credit line recipient, and the merchants where the credit lines are used.

The beneficiary or recipient of the donated credit lines may use the donated credit lines as governed by the donor's terms and then return the donated portion. Thus, the donation of the credit line is hence temporary in nature. The donation may terminate when the terms of usage as mandated by the donors are fulfilled. For example, the donor mandated a one-time usage and beneficiary used it once and paid back all dues. In another example, the donor mandated usage only for 6 months and the 6 month period has expired.

Figure 3:
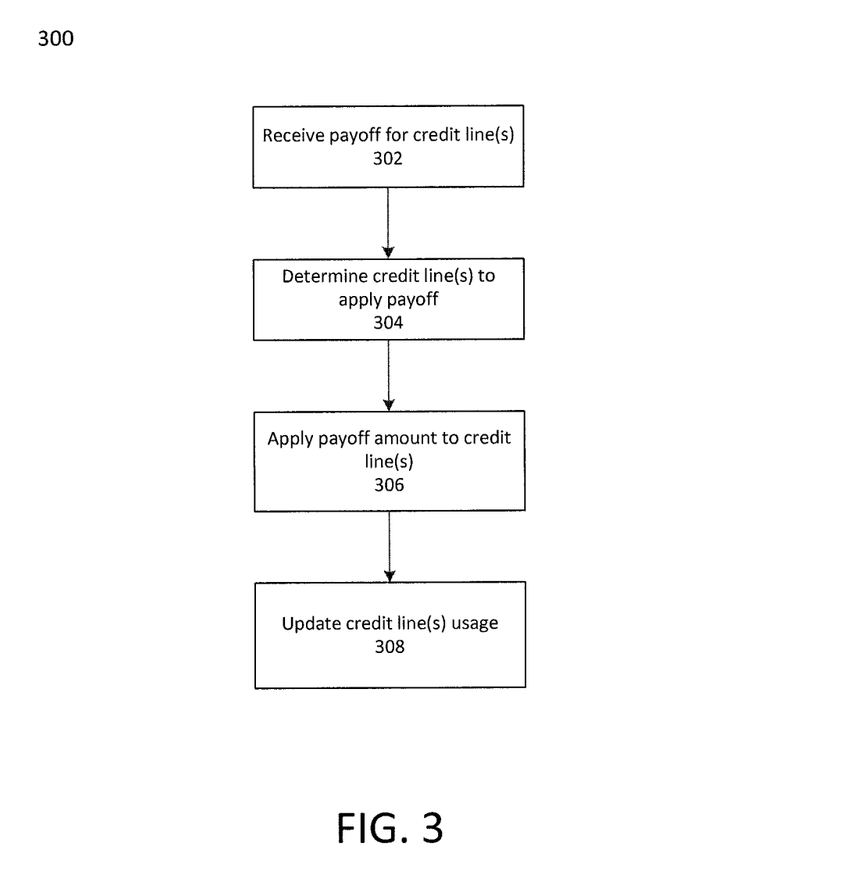
FIG. 3 is a flowchart a process for paying off credit lines according to one embodiment.

FIG. 3 is a flowchart a process 300 for paying off credit lines according to one embodiment. At step 302, the system or the payment service provider may receive payoff funds from the user 110 or the recipient of the donated credit line. The payoff funds may be received as a check payment, as an electronic payment, or as another way of making a payment. In some embodiments, the user 110 may set up a funding source for making electronic payments to pay off the credit lines. As noted above in process 200, the system may have a payoff schedule indicating periodic payment deadlines based on the payoff requirements from one or more donated credit lines. The system may send reminders or notifications to inform the user of any upcoming payment deadlines. In some embodiments, the user 110 may select an automatic payment option by which the system may automatically transfer funds from one or more funding sources to pay off the credit lines based on the payoff schedule.

At step 304, the system may determine how the payment is applied to one or more credit lines. In the case where there are multiple credit lines, the system may divide and apply the payment to the respective credit lines based on their respective payoff requirements. For example, the user 110 may have two donated credit liens to pay off. A first credit line may require a minimum monthly payment of $50 and a second first credit line may require complete payoff in six months. The system may determine a payoff schedule to pay $50 to the first credit line and pay $100 to the second credit line each month. As such, the user 110 may pay $150 each month. The system may designate $50 of the $150 payment to the first credit line and designate $100 of the $150 payment to the second credit line.

In some embodiments, the donated credit lines may provide certain flexibility with regard to the payoff requirements. In this case, the system may determine a payoff schedule based on the user 110's budget or ability to pay. For example, the user 110 may be able to pay $100 a month. In other examples, the user 110 may have a different budget each month and may pay different amounts each month or each week or whenever the user 110 has money. In such cases, the system may not have a fixed payoff schedule and may continuously update the user 110's payoff schedule based on the user 110's budget, income, and expense.

The system may apply the user 110's payment based on various user preferences. For example, the user 110 may prefer to pay off credit lines that have higher interest rates. In another example, the user 110 may prefer to pay off credit lines from donors who are more closely related or have closer relationships to the user 110. Thus, the system may apply the payment to different credit lines based on the relationship between the user 110 and the donors. The system may allow the user 110 to designate how the payment should be applied to different credit lines.

At step 306, the system may apply the payment amount to the designated credit line(s). In particular, the system may divide the payment into different payment amounts and may transfer the payment amounts to the respective lenders to be applied to the respective credit accounts of the donors. The system may transfer the funds to the lenders electronically or by mail (paper check). In some embodiments, the payments may be made first to the donors' accounts at the payment service provider. The system then may make payments to the lenders from the donor's payment account. As such, the lenders receive payments from the donors, rather than from the user 110. This way, the credit line sharing arrangement may be hidden from the lenders.

At step 308, the system may update the credit lines based on the payments made. For example, if a credit line has been used for $500 and the payment to the credit line is $100, the system may update the credit line as having been used for $400. Based on the terms and conditions, payments applied to the credit line may increase the available amount of the credit line that can be used for further borrowing.

In some embodiments, the system may notify the donors that the user 110 has made a payment using the credit line. As such, the donors may be informed that the user 110 is following the payoff schedule to pay off the credit line donated to the user 110. In some embodiments, if the user 110 fails to make payments, the donors may be notified of the failed payments or the default. Because the credit line sharing arrangement is hidden from the lender, the default by the user 110 may negatively impact the donor's credit account at the lender. In the case of a default by the user 110, the system may present the donor with the option of paying the lender on their own to protect their credit history. If the donor chooses to pay the lender on his/her own, the system may allow the donor to transfer funds or payment to the lender. In this case, if the user 110 later makes a late payment, the payment or fund may be credited back to the donor with interest (if any).

In an embodiment, the system may allow the donors to evaluate and/or rate the users who borrowed credit lines from the donors. For example, the donors may evaluate the borrowers on their timeliness on payoff, realization of goals, and other factors. The ratings or evaluation from donors may be indicated in a point system. As such, a trust score may be determined for users who are requesting or have requested for credit line sharing. Donors may review a requester's trust score to determine whether to donate or share the donors' credit line to the requester.

Figure 4:
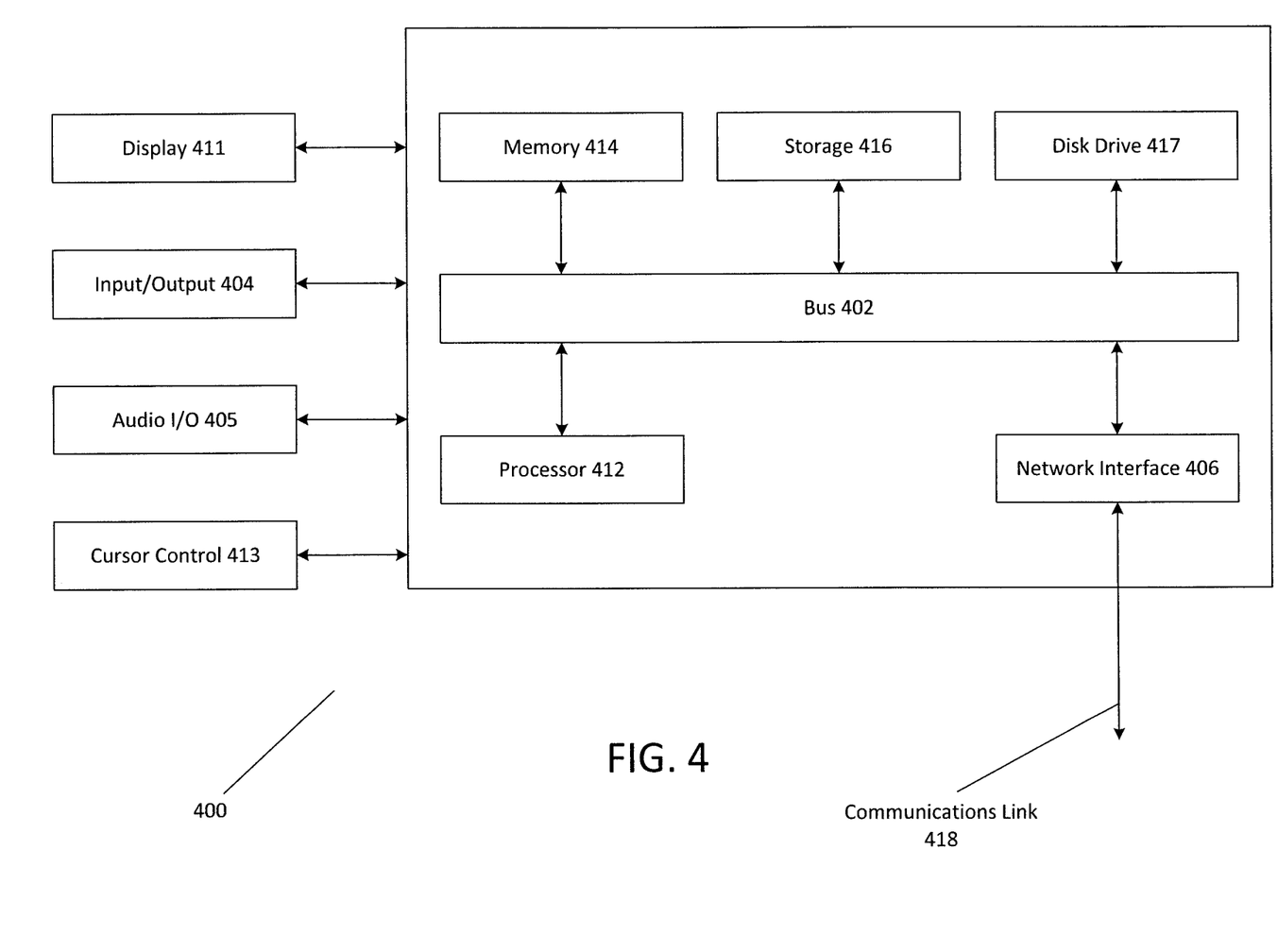
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable computing device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing an account of a first user; and
one or more processors configured to execute instructions to cause the system to perform operations comprising:
generating a uniform resource locator (URL) linking to a webpage for a credit increase by the first user;

transmitting the URL to a second user;
receiving a credit sharing request from the second user via the webpage, wherein the credit sharing request comprises an indication that the second user is willing to provide a portion of a credit line of the second user to the first user;
determining the credit line for the second user from a lender;
designating the portion of the credit line for the first user based on the credit sharing request; and
applying at least some of the portion of the credit line for a transaction conducted by the first user.

2. The system of claim 1, wherein the webpage comprises a graphical interface including a webpage element usable by the second user to provide the portion of the credit line to the first user.

3. The system of claim 2, wherein the URL is transmitted to the second user using an email, a text message, or an online social network website.

4. The system of claim 1, wherein the operations further comprise:
in response to receiving the credit sharing request from the second user for the portion of the credit line, generating the account of the first user; and
providing the portion of the credit line to the account for use with the transaction.

5. The system of claim 4, wherein the credit sharing request comprises a restriction on a use of the portion of the credit line, and wherein the operations further comprise:
setting the restriction on the use of the portion of the credit line with the account.

6. The system of claim 5, wherein the operations further comprise:
receiving a transaction processing request for the transaction; and
determining that the transaction processing request complies with the restriction,
wherein the at least some of the portion is applied to the transaction based on the determining that the transaction processing request complies with the restriction.

7. The system of claim 1, wherein the URL is transmitted to the second user in a post on a social network of the first user.

8. The system of claim 7, wherein the URL links to the webpage via a resident application for a user device.

9. The system of claim 1, wherein the URL redirects to an API of the system for entering the credit sharing request.

10. The system of claim 9, wherein URL is transmitted to the second user with a message included with the credit increase.

11. A method comprising:
receiving a credit line from a first user for credit from a plurality of users;
generating, by one or more hardware processors of a service provider system, a webpage for the credit line, wherein the webpage comprises a graphical interface including a webpage element usable to provide at least a portion of the credit to the first user for the credit line, and wherein the webpage comprises a uniform resource locator (URL) associated with the first user;
transmitting the URL for the webpage to the plurality of users;
receiving, by the one or more hardware processors via the graphical interface of the webpage, a credit sharing request by a second user of the plurality of users to provide the at least the portion of the credit to the first user;
determining a first amount of a first credit line for the second user to share with the first user based on the credit sharing request; and
providing the first amount to the first user.

12. The method of claim 11, further comprising:
receiving an identity request by the second user to remain anonymous to the first user when providing the first amount for the at least the portion of the credit to the first user; and
restricting identification of the second user to the first user.

13. The method of claim 11, wherein the first amount is provided to an account of the first user for a credit purchase using the credit for the credit line, and wherein the first amount is restricted with the account based on a purchase restriction set by the second user.

14. The method of claim 11, further comprising:
providing a summary of credit sharing for the credit of the credit line to the first user, wherein the summary includes at least the first amount provided by the second user.

15. The method of claim 11, further comprising:
receiving a message from the second user to the first user with the credit sharing request; and
communicating the message to the first user.

16. The method of claim 11, wherein the transmitting the webpage to the plurality of users comprises posting the webpage to a social networking page associated with the first user.

17. The method of claim 16, wherein the posting the webpage comprises providing a link to the webpage in a post on the social networking page associated with the first user.

18. The method of claim 11, further comprising:
providing a credit report for at least one of the first user or the credit line to the plurality of users with the webpage.

19. The method of claim 18, further comprising:
determining a credit sharing relationship between the first user and the second user based at least on the credit sharing request; and
restricting the credit sharing relationship from viewing by another user of the plurality of users.

20. A non-transitory machine-readable medium having stored thereon machine-readable instructions executable to cause a machine to perform operations comprising:
in response to receiving a credit increase from a first user for an amount of credit, generating a uniform resource locator for a webpage comprising a graphical interface including a webpage element usable to provide at least a portion of the amount to the first user;
transmitting the webpage to a second user;
receiving a credit sharing request by the second user with the first user;
determining a credit line for the second user with a lender;
determining a first credit amount of a credit line to share with the first user based on the credit sharing request; and
designating the first credit amount of the credit line as available to the first user.

* * * * *

UNITED STATES PATENT AND TRADEMARK OFFICE
CERTIFICATE OF CORRECTION

PATENT NO. : 10,832,320 B2
APPLICATION NO. : 15/682488
DATED : November 10, 2020
INVENTOR(S) : Rahul Nair Page 1 of 1

It is certified that error appears in the above-identified patent and that said Letters Patent is hereby corrected as shown below:

In the Specification

Column 8, Line 5 change "teams" to --terms--

Column 8, Line 9 change "donor's behalf" to --donor's behalf.--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*